US010618490B2

(12) United States Patent
Son et al.

(10) Patent No.: US 10,618,490 B2
(45) Date of Patent: Apr. 14, 2020

(54) OCCUPANT ANKLE PROTECTION APPARATUS FOR VEHICLE

(71) Applicants: Hyundai Motor Company, Seoul (KR); Kia Motors Corporation, Seoul (KR)

(72) Inventors: Yu Ji Son, Gyeonggi-do (KR); Hyock In Kwon, Gyeonggi-Do (KR); Hyo Shub Shin, Seoul (KR); Bo Pil Seo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 205 days.

(21) Appl. No.: 15/826,099

(22) Filed: Nov. 29, 2017

(65) Prior Publication Data

US 2019/0054882 A1 Feb. 21, 2019

(30) Foreign Application Priority Data

Aug. 18, 2017 (KR) .......................... 10-2017-0104770

(51) Int. Cl.
*B60R 21/206* (2011.01)
*B60R 21/2338* (2011.01)
*B60R 21/231* (2011.01)
*B60R 21/00* (2006.01)

(52) U.S. Cl.
CPC ........ *B60R 21/206* (2013.01); *B60R 21/2338* (2013.01); *B60R 2021/0046* (2013.01); *B60R 2021/23176* (2013.01); *B60R 2021/23382* (2013.01); *B60R 2021/23386* (2013.01)

(58) Field of Classification Search
CPC .............. B60R 21/206; B60R 21/2338; B60R 2021/23382; B60R 2021/23176; B60R 2021/23386; B60R 2021/0046
See application file for complete search history.

(56) References Cited

U.S. PATENT DOCUMENTS

| 6,464,246 | B2 * | 10/2002 | Bayley | .................... B60R 21/16 |
| | | | | 280/728.1 |
| 6,685,217 | B2 * | 2/2004 | Abe | ...................... B60R 21/206 |
| | | | | 280/729 |
| 7,066,487 | B2 | 6/2006 | Sullivan et al. | |
| 7,090,245 | B2 * | 8/2006 | Yoshikawa | ........... B60R 21/206 |
| | | | | 280/729 |

(Continued)

FOREIGN PATENT DOCUMENTS

| JP | 2004168280 A | * | 6/2004 |
| KR | 2007-0107967 A | | 11/2007 |
| KR | 10-0831500 B1 | | 5/2008 |

*Primary Examiner* — Paul N Dickson
*Assistant Examiner* — Timothy Wilhelm
(74) *Attorney, Agent, or Firm* — Mintz Levin Cohn Ferris Glovsky and Popeo, P.C.; Peter F. Corless

(57) ABSTRACT

Disclosed is an occupant ankle protection apparatus for a vehicle. When an airbag cushion deploys, side portions support the fronts of both ankles of an occupant and a center portion is inserted between the ankles and supports the inner sides of the ankles. Accordingly, the apparatus is capable of preventing injury to the ankles of the occupant and preventing a secondary injury by allowing an occupant to escape from the vehicle after a vehicle collision.

12 Claims, 7 Drawing Sheets

(56) References Cited

U.S. PATENT DOCUMENTS

| | | | | |
|---|---|---|---|---|
| 7,549,672 | B2* | 6/2009 | Sato | B60R 21/207 |
| | | | | 280/729 |
| 7,604,252 | B2* | 10/2009 | Heitplatz | B60R 21/206 |
| | | | | 280/729 |
| 7,661,700 | B2* | 2/2010 | Imamura | B60R 21/203 |
| | | | | 280/730.1 |
| 7,669,897 | B2* | 3/2010 | Sano | B60R 21/045 |
| | | | | 280/729 |
| 7,744,117 | B2* | 6/2010 | Fukawatase | B60R 21/231 |
| | | | | 280/730.1 |
| 8,215,667 | B2* | 7/2012 | Matsushima | B60R 21/201 |
| | | | | 280/728.3 |
| 8,292,323 | B2* | 10/2012 | Matsushima | B60R 21/231 |
| | | | | 280/730.1 |
| 9,211,860 | B2* | 12/2015 | Muraji | B60R 21/23138 |
| 9,227,590 | B2* | 1/2016 | Fujiwara | B60R 21/23138 |
| 9,272,681 | B1 | 3/2016 | Enders | |
| 9,283,916 | B2* | 3/2016 | Nagasawa | B60R 21/231 |
| 9,475,445 | B2* | 10/2016 | Jindal | B60R 21/233 |
| 9,994,181 | B1* | 6/2018 | Dubaisi | B60R 21/207 |
| 10,336,283 | B2* | 7/2019 | Rickenbach | B60R 21/233 |
| 10,351,091 | B2* | 7/2019 | Abe | B60R 21/206 |
| 2002/0149187 | A1* | 10/2002 | Holtz | B60R 21/206 |
| | | | | 280/749 |
| 2006/0131847 | A1* | 6/2006 | Sato | B60R 21/207 |
| | | | | 280/730.2 |
| 2008/0122205 | A1* | 5/2008 | Imamura | B60R 21/203 |
| | | | | 280/730.1 |
| 2017/0057447 | A1* | 3/2017 | Ando | B60R 21/233 |
| 2018/0319358 | A1* | 11/2018 | Schneider | B60R 21/233 |
| 2019/0061667 | A1* | 2/2019 | Abe | B60R 21/206 |
| 2019/0161045 | A1* | 5/2019 | Thomas | B60R 21/21 |

* cited by examiner

OCCUPANT ANKLE PROTECTION APPARATUS FOR VEHICLE

CROSS REFERENCE TO RELATED APPLICATION

The present application claims priority to Korean Patent Application No. 10-2017-0104770, filed Aug. 18, 2017, the entire contents of which is incorporated herein for all purposes by this reference.

BACKGROUND

Field of the Disclosure

The present disclosure relates to an occupant ankle protection apparatus for a vehicle that prevents the occupant's ankles from being injured during a vehicle collision.

Description of the Related Art

Technologies for securing the driving ability, convenience, functionality of a vehicle, and safety for occupants have been developed. In particular, among various automotive safety devices, an airbag has been used as an effective device for preventing an occupant from an external impact.

An airbag, which is a device for protecting vehicle occupants during a collision, includes a collision sensor configured to sense a vehicle collision, a controller configured to operate the airbag, based on the sensing result of the collision sensor, and an airbag module configured to operate the airbag in response to a signal from the controller, and is classified into a driver airbag, an occupant airbag, a side airbag, and a roof airbag based on the mounting position of the airbag or the occupants subject to protection from the collision.

However, many existing airbags are designed to stably protect the upper body of an occupant. Recently, airbags for protecting the knees of a driver have been proposed, but ankles are still not protected, so the injury of ankles due to sprain may still occur. In other words, when the entire body of an occupant is moved by a vehicle collision with the soles of the occupant's feet on the floor, the ankles may be injured. When occupant's ankles are injured during a vehicle collision, the occupant has difficulty in escaping from the vehicle, so a secondary accident may occur. Accordingly, there is a need for a device for protecting the ankles of an occupant in a vehicle collision.

The foregoing is intended merely to aid in the understanding of the background of the present disclosure, and is not intended to mean that the present disclosure falls within the purview of the related art that is already known to those skilled in the art.

SUMMARY

The present disclosure provides an occupant ankle protection apparatus for a vehicle for preventing the occupant's ankles from being injured during a vehicle collision.

An occupant ankle protection apparatus for a vehicle according to an aspect of the present disclosure may include an airbag cushion folded in an airbag housing, connected to an inflator in the airbag housing, and configured to deploy toward ankles of an occupant when the inflator is operated such that a center portion of the airbag cushion protrudes further toward the occupant than both side portions of the airbag cushion whereby the center portion is inserted between the ankles of the occupant and the side portions support fronts of the ankles of the occupant.

The airbag cushion may be disposed inside an indoor panel disposed above an occupant and may be configured to deploy down toward both ankles of the occupant. The airbag cushion may be formed in a T-shape with the center portion thereof protruding down further than the side portions when deployed. The side portions may be curved downward at ends to cover fronts and outer sides of both ankles of an occupant when the airbag cushion deploys.

The apparatus may further include outer tethers of which first ends connected to ends of the side portions and second ends connected to sides or a lower end of the center portion to pull the ends of the side portions toward the center portion in contact with ankles of an occupant and thus, the side portions may cover the ankles of the occupant when the airbag cushion deploys.

The center portion may be formed to be tapered downward when the airbag cushion deploys. The airbag cushion may further have a separation wall that crosses the center portion horizontally and has one or more apertures so that the side portions expand and then a protruding portion of the center portion expands when the airbag cushion deploys. The separation wall may be disposed in the airbag cushion at a position where the center portion protrudes further than the side portions. Additionally, lids may be disposed on the separation wall to close the apertures and inner tethers may be connected to the lids at first ends and connected to the side portions at second ends to be pulled with the lids by expansion of the side portions to open the apertures previously closed by the lids when the airbag cushion deploys.

According to the occupant ankle protection apparatus for a vehicle of the present disclosure, when an airbag cushion deploys, side portions support the fronts of both ankles of an occupant and a center portion is inserted between the ankles and supports the inner sides of the ankles, thereby preventing the ankles of the occupant from being injured. Accordingly, the ankles of an occupant may be protected and the occupant may escape from a vehicle after a vehicle collision, thus preventing a secondary accident.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
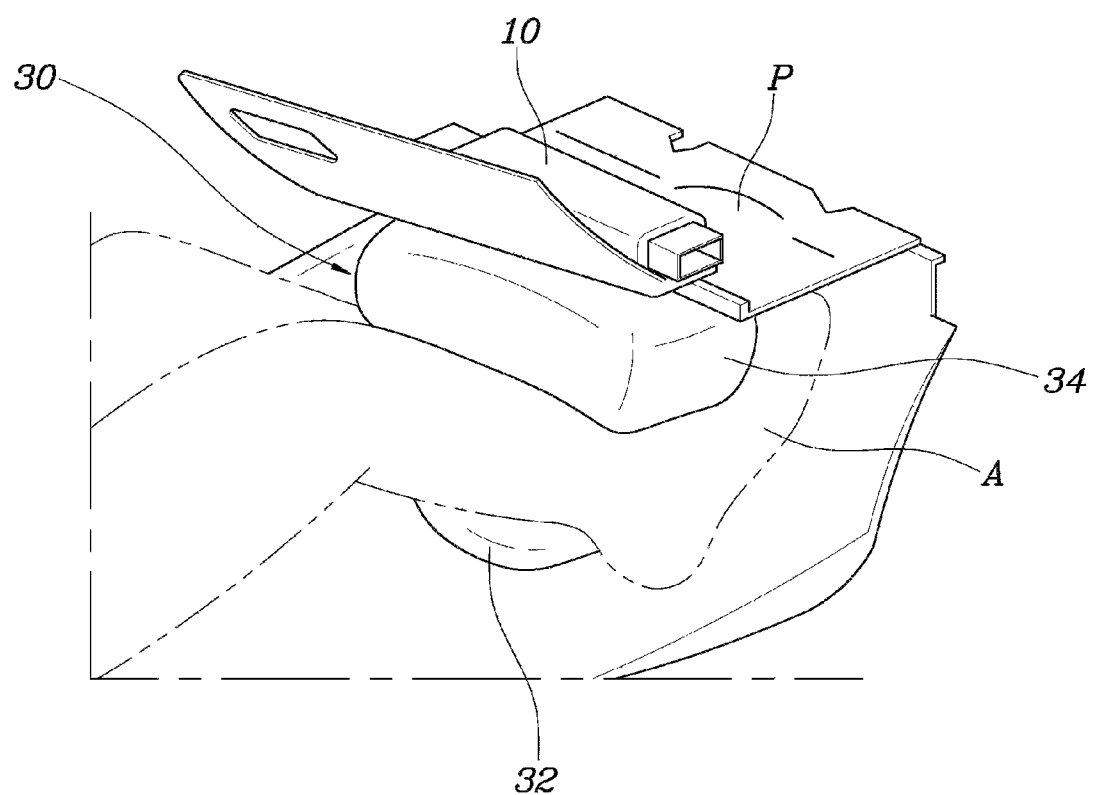
FIG. 1 is a view showing an occupant ankle protection apparatus for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, exemplary embodiments of the present disclosure will be described in detail with reference to the accompanying drawings. Throughout the drawings, the same reference numerals will refer to the same or like parts.

Figure 2:
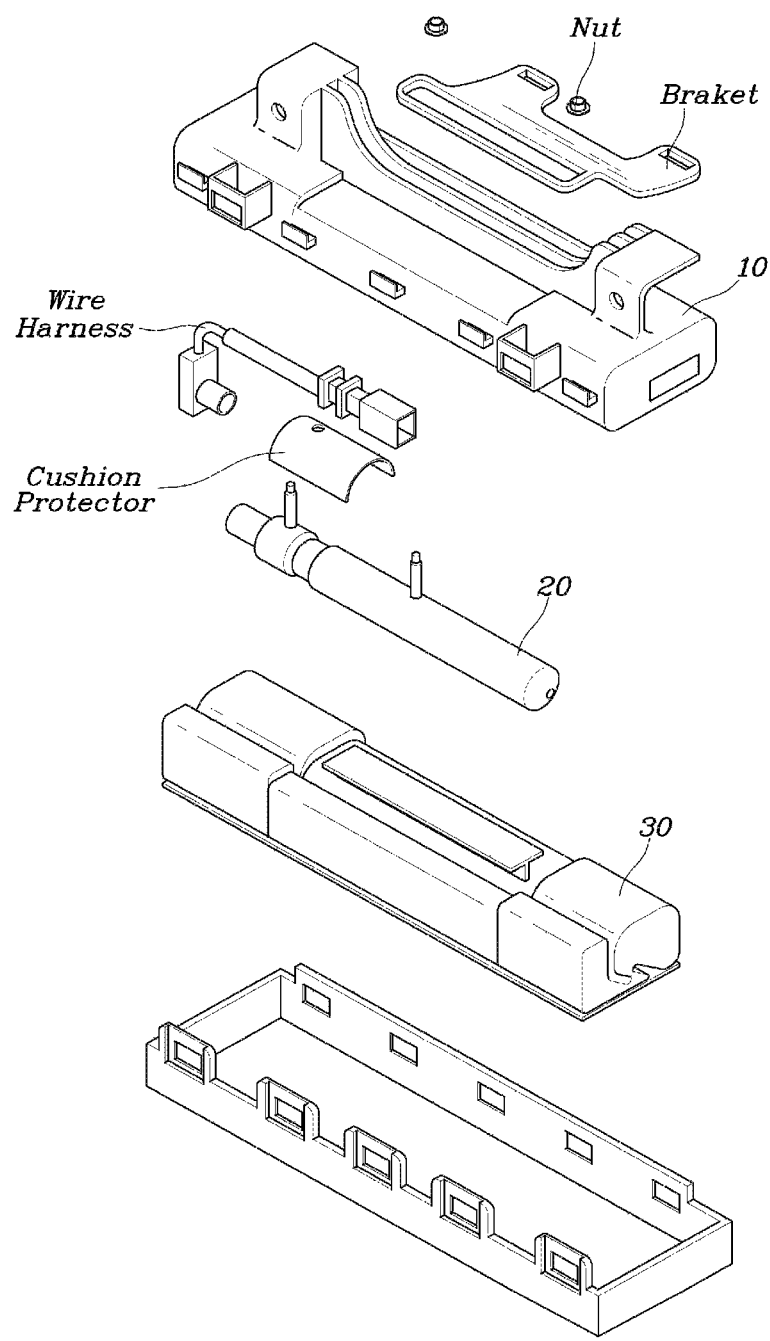
FIG. 2 is an assembly view of the occupant ankle protection apparatus for a vehicle shown in FIG. 1 according to an exemplary embodiment of the present disclosure.

An occupant ankle protection apparatus for a vehicle according to an exemplary embodiment of the present disclosure is described hereafter with reference to the accompanying drawings. FIG. 1 is a view showing an occupant ankle protection apparatus for a vehicle according to an exemplary embodiment of the present disclosure and FIG. 2 is an assembly view of the occupant ankle protection apparatus for a vehicle shown in FIG. 1. FIGS. 3 to 7 are views illustrating the occupant ankle protection apparatus for a vehicle shown in FIG. 1.

An occupant ankle protection apparatus for a vehicle according to the present disclosure, as shown in FIG. 1, may include an airbag cushion that is folded in an airbag housing 10, is connected to an inflator in the airbag housing 10, and configured to deploy toward the ankles A or feet area of an occupant when the inflator 20 is operated with a center portion 32 thereof protruding further toward the occupant than both side portions 34. Accordingly, the center portion 32 may be inserted between the ankles A of the occupant and the side portions 34 may support the fronts of the ankles A of the occupant.

When the airbag cushion 30 of the present disclosure deploys, the center portion 32 protrudes further toward an occupant than the side portions 34 and may contact and support the inner sides of both ankles A of the occupant and the side portions 34 may contact with and support the fronts of the ankles A of the occupant. Accordingly, when the airbag deploys, the center portion 32 may be inserted between both ankles of the occupant and prevent the ankles A of the occupant from transversely moving and both side portions 34 may support the fronts of the ankles A, to thus protect the ankles A from an external impact and prevent the ankles A from being injured (e.g., sprained).

According to the airbag cushion 30 of the present disclosure, both side portions 34 may support the fronts of both ankles A of an occupant and the center portion 32 may be inserted between the ankles A of the occupant, and thus, the ankles A of the occupant may be prevented from being injured, and thus, injury to the ankles A of the occupant may be minimized during a vehicle collision.

The present disclosure is described in more detail. As shown in FIG. 1, the airbag cushion 30 may be disposed inside an indoor panel P disposed above an occupant to be able to deploy down toward both ankles A of the occupant. The indoor panel P, which is a panel disposed under the steering wheel, is disposed over the legs of an occupant.

The airbag cushion 30 is received inside the airbag housing 10 and connected to the inflator 20 to be supplied with gas from the inflator 20. In other words, as shown in FIG. 2, the inflator 20 and the airbag cushion 30 may be folded inside the airbag housing 10 to allow the airbag cushion 30 to be deployed by gas from the inflator 20 in a collision. The airbag housing 10 may be fixed inside the indoor panel P by specific brackets and the airbag cushion 30 may be configured to deploy toward the fronts of both ankles A of an occupant A, and thus, the open side of the airbag housing 10 may be formed at the lower end. Further, as shown in FIG. 3, the airbag cushion 30 may deploy in a T-shape with the center portion 32 protruding further downward than the side portions 34.

As described above, the airbag cushion 30 may be formed in a T-shape and thus, the side portions 34 may contact and support the fronts of both ankles A of an occupant and the center portion 32 may protrude further downward than the side portions 34 to be inserted between the ankles A of the occupant when the airbag cushion 30 deploys. Accordingly, when the airbag cushion 30 deploys, the center portion 32 may be inserted between both ankles of the occupant to prevent the ankles A of the occupant from transversely moving and both sides portions 34 may support the fronts of the ankles A to protect the ankles A from an external impact and prevent the ankles A from being injured.

Figure 3:
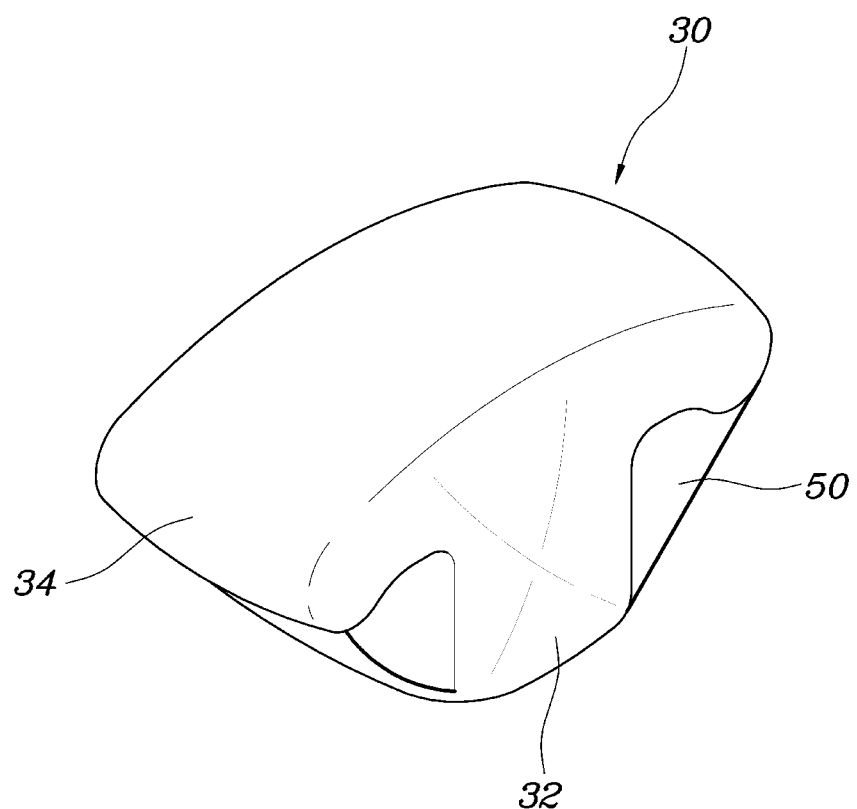
FIGS. 3 to 7 are views illustrating the occupant ankle protection apparatus for a vehicle shown in FIG. 1 according to an exemplary embodiment of the present disclosure.
Figure 4:
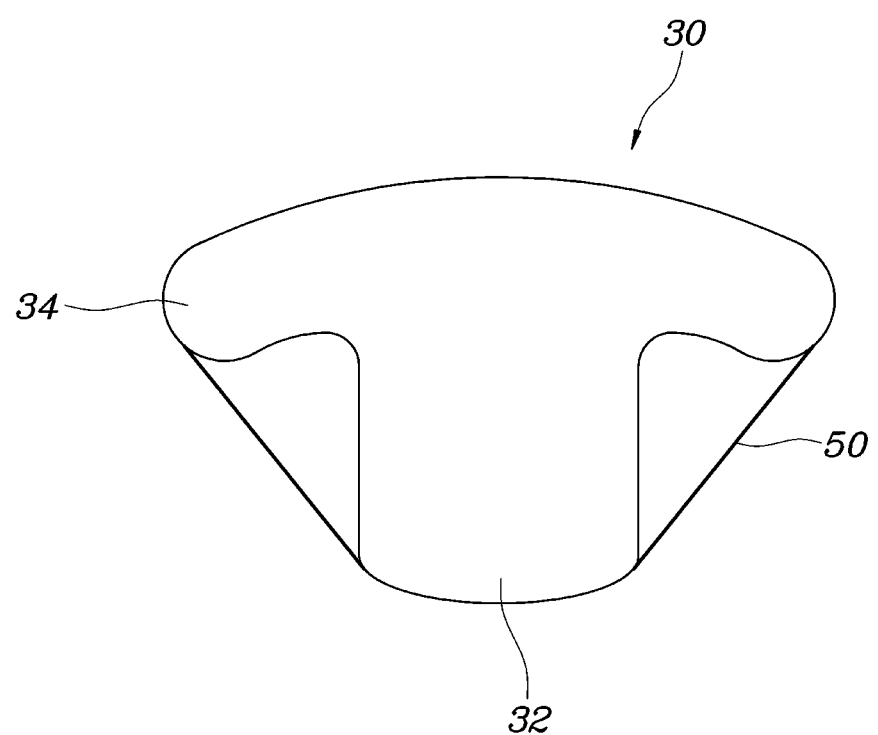

Further, as shown in FIGS. 3 and 4, the ends of the side portions 34 may be curved downward to cover the fronts and the outer sides of both ankles A of an occupant when the airbag cushion 30 deploys. This configuration prevents both ankles A of an occupant from transversely moving. Accordingly, since the ends of both side portions 34 of the airbag cushion 30 may be curved downward, the fronts and outer sides of the ankles A of the occupant may be covered and, the center portion 32 may be inserted between the ankles A, thereby covering the inner sides of the ankles A of the occupant.

Further, as show in FIG. 4, the airbag cushion 30 may further include outer tethers 50 of which first ends may be connected to the ends of the side portions 34 and second ends may be connected to the sides or the lower end of the center portion 32. When the airbag cushion 30 deploys, the outer tethers 50 connected to the ends of the side portions 34 and the center portion 32 may be tensioned in contact with the ankles A of an occupant. In particular, the outer tethers 50 may be pushed by the ankles A of the occupant and the ends of the side portions 34 connected to the outer tethers 50 may be pulled, whereby the side portions 34 cover the ankles A of the occupant. Accordingly, since the airbag cushion 30 may further include the outer tethers 50 connected to the ends of the side portions 34 and both sides of the center portion 32, when the airbag cushion 30 deploys, the airbag cushion 30 may cover and fix the fronts, inner sides, and outer sides of both ankles A of an occupant, to prevent the ankles A of the occupant from moving transversely, to prevent injury, and to protect the occupant lower body from an external impact.

Meanwhile, the center portion 32 may be formed to be tapered downward when the airbag cushion 30 deploys. Since the center portion 32 of the airbag cushion 30 may be tapered downward, as described above, when the airbag cushion 30 deploys, the center portion 32 may be more easily inserted between both ankles A of an occupant more easily. Accordingly, even when both ankles A of an occupant are positioned close to each other (e.g., in contact with each other), the center portion 32 of the airbag cushion 30 may be inserted into the space between the ankles A of the occupant A to prevent transverse movement of the ankles A of the occupant.

Figure 5:
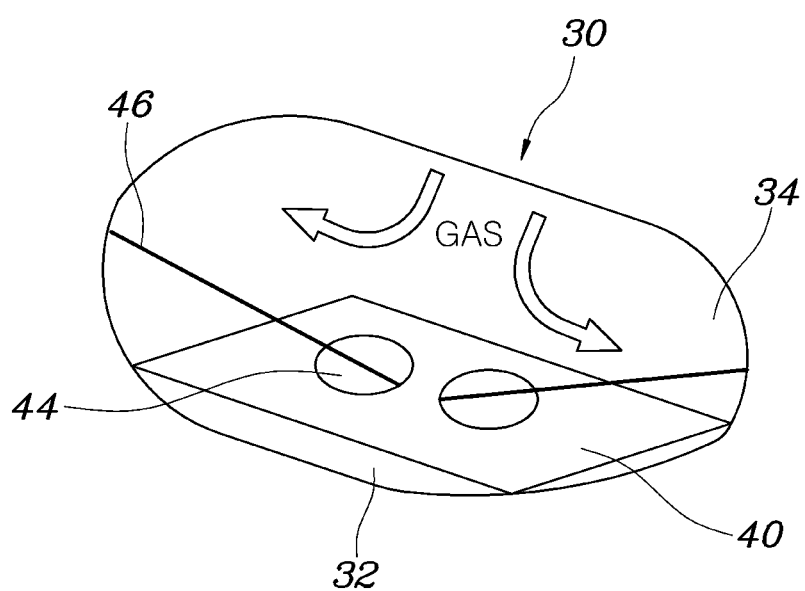
Figure 6:
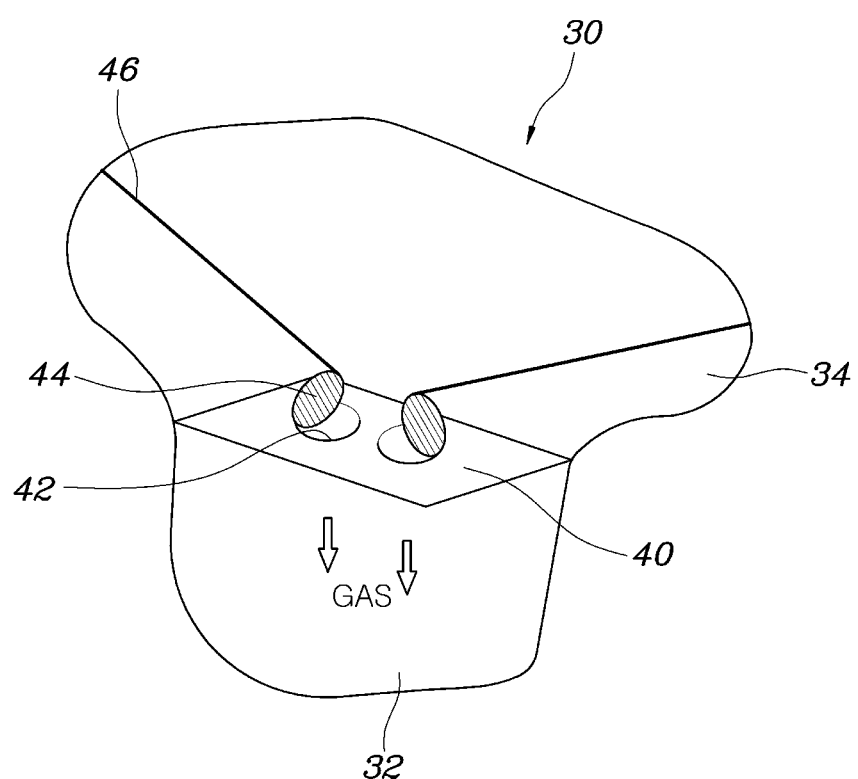
Figure 7:
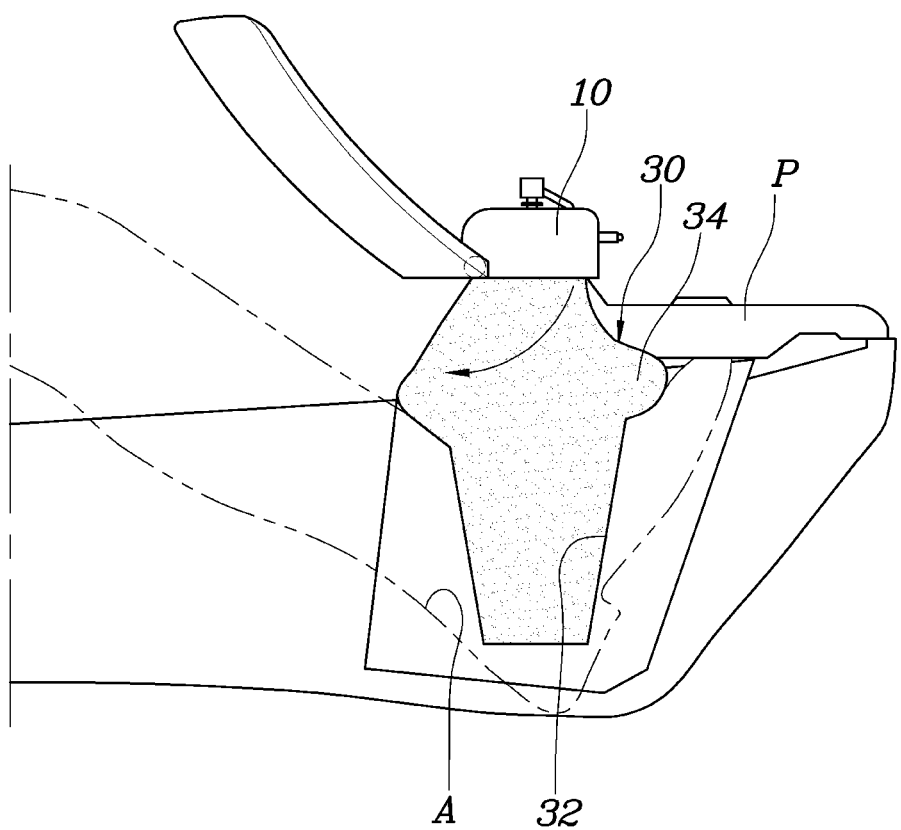

Furthermore, as shown in FIGS. 5 and 6, the airbag cushion 30 may further include a separation wall 40 that crosses the center portion 32 horizontally and may include one or more apertures 42 so that the side portions 34 expand and then the protruding portion of the center portion 32 expands when the airbag cushion 30 deploys. The separation wall 40 may be disposed in the airbag cushion 30 at a position where the center portion 32 further protrudes than the side portions 34.

Since the separation wall 40 crossing the center portion 32 may be disposed in the airbag cushion 30, the side portions 34 may expand first by the gas from the inflator 20 and then the gas may flow to the protruding portion of the center portion 32 through the apertures 42 of the separation wall 40, to secondarily expand protruding portion of the center portion 32. The size and number of the apertures 42 of the separation wall 40 may be set such that the side portions 34 are sufficiently expanded and then the protruding portion of the center portion 32 may be expanded thereafter. Accordingly, even when an occupant sits with legs crossed or a similar position, it may be possible to prevent the occupant from being injured due to expansion of the airbag cushion 30, since the expansion force of the center portion 32 is reduced by the separation wall 40 in the airbag cushion 30.

Further, as shown in FIGS. 5 and 6, the airbag cushion 30 may further include a plurality of lids 44 on the separation wall 40 to close the apertures 42 and inner tethers 46 of which first ends may be connected to the lids 44 and second ends may be connected to the side portions 34 to be pulled with the lids 44 by expansion of the side portions 34 to open the apertures 42 when the airbag cushion 30 deploys. In other words, since the lids 44 or covers used to close the apertures 42 of the separation wall 40 and the inner tethers 45 for opening the lids 44 when the airbag cushion 30 deploys are disposed inside the airbag cushion 30, when the airbag cushion 30 deploys, the side portions 34 may expand first and then the protruding portion of the center portion 32 may expand downward thereafter.

In particular, as shown in FIG. 5, when the airbag cushion 30 does not deploy yet, the apertures 42 of the separation wall 40 may be closed by the lids 44. When the airbag cushion 30 deploys, the side portions 34 expand first due to the gas from the inflator 20 being prevented from flowing to the protruding portion of the center portion 32 due to the apertures 42 of the separation wall 40 being closed by the lids 44. When the side portions 34 of the airbag cushion 30 expand, as shown in FIG. 6, the inner tethers 46 may be pulled and the lids 44 connected to the inner tethers 46 may also be pulled, and thus, the apertures 42 of the separation wall 40 may be opened. Accordingly, the gas from the inflator 40 may flow to the protruding portion of the center portion 32 through the apertures 42 after expanding the side portions 42 of the airbag cushion 30, whereby the center portion 32 may expand and protrude downward.

According to the airbag cushion 30 of the present disclosure, as described above, since the side portions 34 may expand first and support the fronts of both ankles A of an occupant and then the center portion 32 may expand after the side portions 34 sufficiently expand, the center portion 32 may prevent the ankles A of the occupant from transversely moving by being inserted between the ankles A of the occupant. Therefore, it may be possible to minimize injury to the ankles A of an occupant when the airbag deploys, and to prevent the ankles from being sprained by completely fixing the ankles A of the occupant after the airbag deploys.

According to the occupant ankle protection apparatus for a vehicle described above, when the airbag cushion 30 deploys, the side portions support the fronts of both ankles A of an occupant and the center portion may be inserted between the ankles A and support the inner sides of the ankles A, thereby preventing the ankles A of the occupant from being injured. Therefore, the ankles of an occupant may be protected and the occupant may escape from a vehicle after a vehicle collision, thus preventing a secondary accident.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An occupant ankle protection apparatus for a vehicle, comprising:
    an airbag cushion folded in an airbag housing, connected to an inflator in the airbag housing, and configured to deploy toward ankles of an occupant when the inflator is operated,
    wherein a center portion of the airbag cushion protrudes further toward the occupant than side portions of the airbag cushion,
    wherein the center portion is configured to be inserted between the ankles of the occupant, and the side portions are configured to support fronts of the ankles of the occupant,
    wherein the airbag cushion further comprises a separation wall that horizontally crosses the center portion and includes one or more apertures to allow the side portions to expand and a protruding portion of the center portion to expand thereafter when the airbag cushion deploys,
    wherein the separation wall is disposed in the airbag cushion at a position where the center portion protrudes further than the side portions, and
    wherein a plurality of lids are disposed on the separation wall to close the apertures, and inner tethers are connected to the lids at first ends thereof and connected to the side portions at second ends thereof to be pulled with the lids by expansion of the side portions to open the apertures when the airbag cushion deploys.

2. The apparatus of claim 1, wherein the airbag cushion is disposed inside an indoor panel disposed above the occupant and configured to be deployed down toward the ankles of the occupant.

3. The apparatus of claim 1, wherein the airbag cushion is formed in a T-shape with the center portion protruding down further than the side portions when deploys.

4. The apparatus of claim 1, wherein the side portions are curved downward at ends thereof and configured to cover fronts and outer sides of both ankles of the occupant when the airbag cushion deploys.

5. The apparatus of claim 1, further comprising:
    outer tethers having first ends connected to ends of the side portions and second ends connected to sides or a lower end of the center portion to pull the ends of the side portions toward the center portion, the outer tethers configured to contact the ankles of the occupant and configured to cover the ankles of the occupant when the airbag cushion deploys with the side portions.

6. The apparatus of claim 1, wherein the center portion is formed to be tapered downward when the airbag cushion deploys.

7. An occupant ankle protection apparatus for a vehicle, comprising:
   an airbag cushion folded in an airbag housing, connected to an inflator in the airbag housing, and configured to deploy downward when the inflator is operated; and
   a separation wall that horizontally crosses a center portion of an airbag cushion and includes one or more apertures to allow side portions of the airbag cushion to expand and a protruding portion of the center portion to expand thereafter when the airbag cushion deploys,
   wherein the center portion of the airbag cushion protrudes further toward the occupant than both side portions of the airbag cushion,
   wherein the separation wall is disposed in the airbag cushion at a position where the center portion protrudes further than the side portions, and
   wherein a plurality of lids are disposed on the separation wall to close the apertures, and inner tethers are connected to the lids at first ends thereof and connected to the side portions at second ends thereof to be pulled with the lids by expansion of the side portions to open the apertures when the airbag cushion deploys.

8. The apparatus of claim 7, wherein the airbag cushion is disposed inside an indoor panel and deploys downward.

9. The apparatus of claim 7, wherein the airbag cushion is formed in a T-shape with the center portion protruding down further than the side portions when deploys.

10. The apparatus of claim 7, wherein the side portions are curved downward at ends thereof.

11. The apparatus of claim 7, further comprising:
    outer tethers having first ends connected to ends of the side portions and second ends connected to sides or a lower end of the center portion to pull the ends of the side portions toward the center portion.

12. The apparatus of claim 7, wherein the center portion is formed to be tapered downward when the airbag cushion deploys.

* * * * *